United States Patent [19]

Cosson

[11] 4,415,042

[45] Nov. 15, 1983

[54] REPLACEABLE RIPPER SHOE

[76] Inventor: Keith J. Cosson, Hwy. 85, P.O. Box 968, Eaton, Colo. 80615

[21] Appl. No.: 294,495

[22] Filed: Aug. 20, 1981

[51] Int. Cl.³ .......................................... A01B 13/08
[52] U.S. Cl. .................................. 172/749; 172/762; 172/725
[58] Field of Search ............... 172/752, 762, 749, 725, 172/753, 719, 721, 699; 37/142 R, 141 T

[56] References Cited

U.S. PATENT DOCUMENTS

| | | | |
|---|---|---|---|
| 19,262 | 2/1858 | Ramage | 172/752 |
| 30,744 | 11/1860 | McCoy | 172/725 X |
| 80,015 | 7/1868 | Routt | 172/725 X |
| 555,804 | 3/1896 | Cummings | 172/725 X |
| 1,073,984 | 9/1913 | Hartig | 172/762 |
| 1,916,833 | 7/1933 | Gadd | 172/749 X |
| 2,013,818 | 9/1935 | Wiese | 172/719 |
| 2,063,688 | 12/1936 | Lier | 172/719 |
| 2,222,071 | 11/1940 | Gustafson | 172/762 |
| 2,860,861 | 11/1958 | Larson | 37/142 R |
| 2,940,192 | 6/1960 | Lattner | 37/142 R |
| 3,085,635 | 4/1963 | Livermore | 172/725 X |
| 3,254,727 | 6/1966 | Helton | 172/719 |
| 3,268,012 | 8/1966 | Ratkowski | 37/142 R |
| 4,269,274 | 5/1981 | Robertson | 172/699 |

FOREIGN PATENT DOCUMENTS

| | | | |
|---|---|---|---|
| 106027 | 12/1938 | Australia | 172/762 |
| 207603 | 2/1960 | Austria | 172/752 |

*Primary Examiner*—Richard J. Johnson
*Attorney, Agent, or Firm*—Dean P. Edmundson

[57] ABSTRACT

In the agricultural industry, one cultivator wheeled cart cultivator implement has a vertical ripper blade for use in ripper cultivating the soil usually between rows of growing crops. The vertical blade has its front edge sharpened. There is usually a lower point to the blade. Such sharpened front edge portion of the blade which is drawn through the ground, as well as its lowermost point, wear out rapidly, as a result of cultivating in gravelly or hard soil, and have to be replaced often on comparatively small use. Such replacement heretofore required the use of complicated bolt securement of parts, at the front edge and lower ends of the cultivator ripper blade, and the parts to accomplish that replacement are needlessly numerous and complicated and expensive.

19 Claims, 7 Drawing Figures

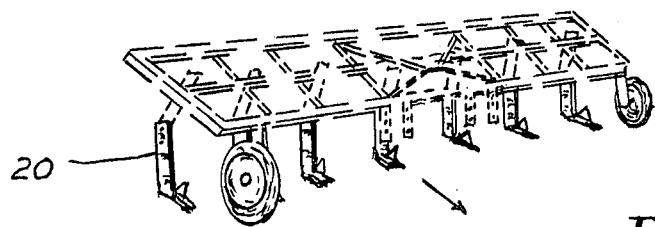
Fig. 1
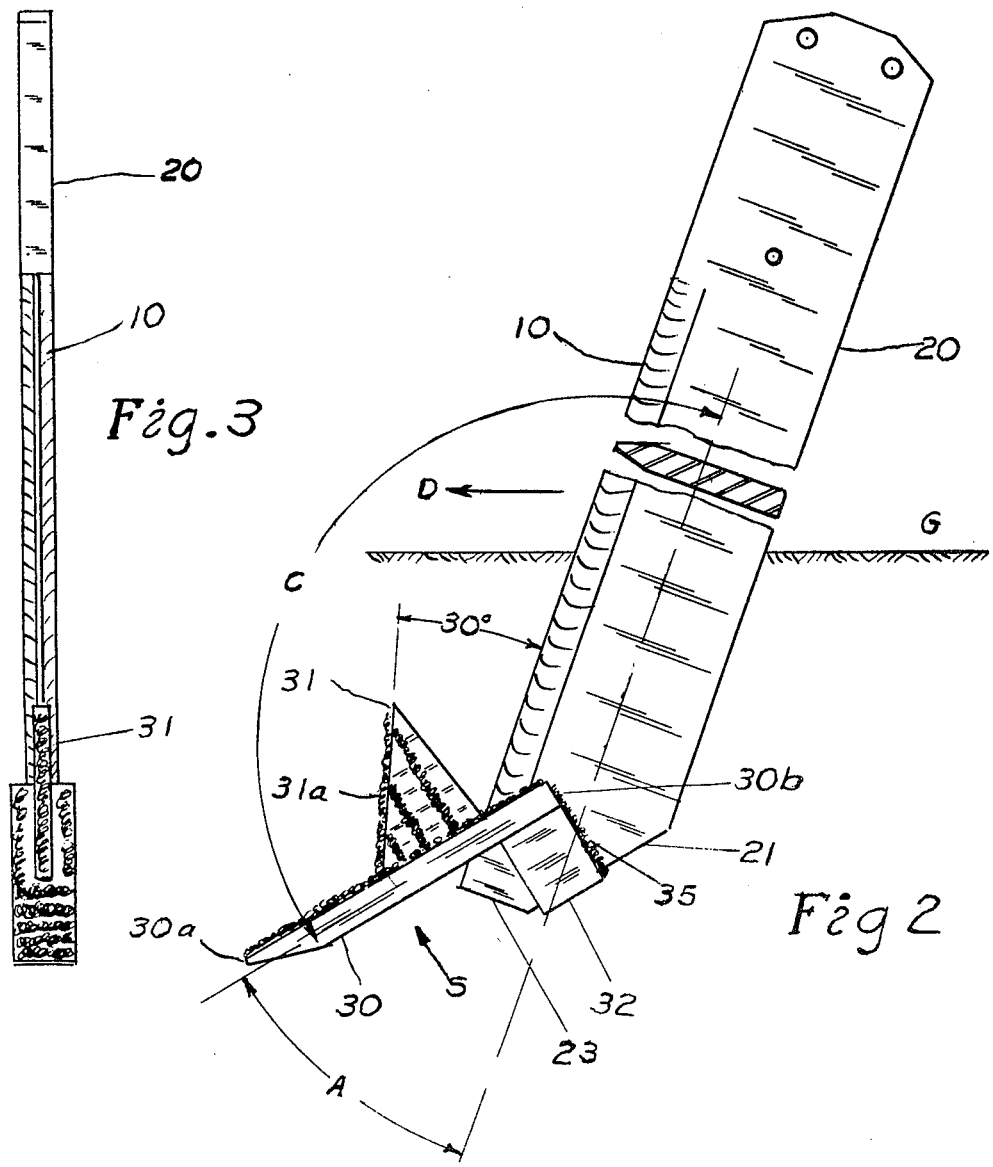
Fig. 3
Fig 2

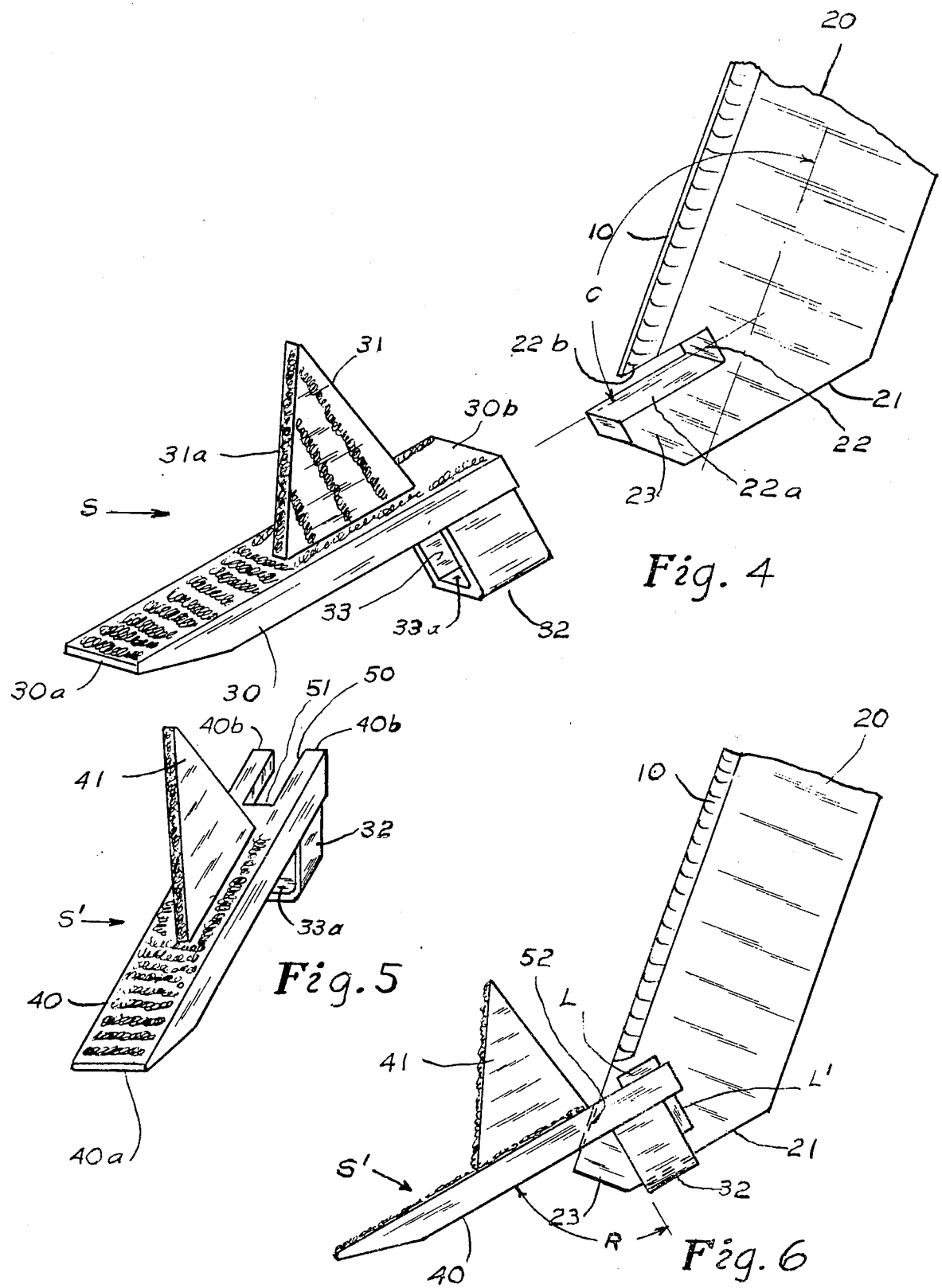

4,415,042

REPLACEABLE RIPPER SHOE

BACKGROUND OF THE INVENTION

This invention preferred embodiment is of a single replaceable shoe adapted to be secured to the lower front end of a cultivator ripper shank. The shoe comprises a slip-on member having a pointed plate at one of its ends. A stirrup is secured on the underside of the other of its ends. A vertical fin is secured on the plate on the side thereof opposite from its stirrup and midway of the ends of that side. The shoe is adapted to have its plate end opposite from its point inserted into a slot provided at the lower end of a cultivator ripper shank, and with the shoe stirrup snugly enveloping the lower end of said shank. Upon such insert, the fin on the shoe is in parallel alignment ahead of the lower front sharp edge of the ripper shank, for diverting soil by the fin and consequent soil wear of the lower shank leading edge upon cultivator use, and for preventing soil ripper shank caused hooving or slick piling against adjacent crop rows, when cultivator used between rows in cultivating such crops.

BRIEF SUMMARY AND OBJECTS OF THE INVENTION

Instead of an agricultural cultivator ripper implement having a vertical ripper shank with its lower end having complicated multiple blade parts bolted thereon as a protective shoe, my invention comprises a single slip-on shoe, adapted to slip-on cooperate with the lower end of the cultivator shank, by being held thereto without the need of bolts or screws or tools. That holding is accomplished by friction holding of the shoe in a slot provided in the ripper lower shank end, which holding is assisted by soil pressure during cultivation use, on using the cultivator shank with my new replaceable shoe thereon. The shoe of this invention comprises a sharpened elongated blade, a vertical triangular fin on the upper surface of the blade midway of its ends, and a stirrup member secured to its underside of its end opposite from its point. I provide the lower end of the shank with a slot of a size adapted to frictionally snugly slip-in receive the end of the shoe plate opposite from its point, and then in that position the shoe fin extends upwardly spacedly forwardly from and aligned with the front zipper edge of the shank, and the stirrup of the shoe then snugly slip-on envelops the lower end of a tongue of the shank. In such attachment and use, the end of the plate in the slot and the stirrup enveloping the underside of the shank tongue, individually and together, comprise a self-holding of my slip-on shoe on the lower end of the ripper shank.

It is the principal object of this invention to provide a single replaceable slip-on ripper shank shoe adapted for use on a tongue at the lower ripper shank end, with the shoe having a stirrup adapted for stirrup snug enveloping the lower end of the tongue of the lower ripper shank upon slip-on attachment of the shoe onto the shank, for thereby so holding the shoe on the shank by the stirrup.

Another object of the invention is to provide such a replaceable shoe for a ripper shank and having a vertical fin welded to the shoe upper leading surface, so as to have the fin spacedly ahead of and aligned with the front edge of the lower ground ripping shank, for effecting a diversion of the soil by the fin, and thereby effecting a consequent reduction of soil wear on that leading edge of the shank, on ripper cultivator use.

Another object is the provision of a single slip-on replaceable ripper shoe, having a plate with a point at one of its ends and a stirrup under the other of its ends, and a vertical fin midway of its plate surface ends opposite from the stirrup side thereof, with the lower end of the shank to which the shoe is adapted to be secured having a slot formed therein, into which slot the other plate end is adapted to be slip-on snugly inserted and held, and upon such slot insert the stirrup rests snugly under the lower end of the shank and thereby holds the shoe onto that lower end.

BRIEF DESCRIPTION OF THE DRAWINGS

FIG. 1 is a reduced perspective view of a cultivator implement having vertical ripper blades.

FIG. 2 is an enlarged side elevational view of a ripper blade having my replaceable shoe fully positioned thereon at its lower end.

FIG. 3 is a front elevational view of the ripper shank with my new replaceable shoe thereon.

FIG. 4 is an exploded view of my replaceable shoe, and partially of the lower end of a ripper shank before my replaceable shoe is slip-on secured thereto.

FIG. 5 is a small elevational view of a modified replacer shoe, involving the principles of this invention.

FIG. 6 is a partial side view of how this modified replaceable shoe of FIG. 5 would appear after insertion on the lower end of a ripper shank.

DESCRIPTION OF THE INVENTION

In the drawings, FIG. 1 diagrammatically illustrates in small scale an agricultural implement having a wheeled cart supporting a frame, and with a plurality of adjustable spaced apart vertical shank ripper members 20. Each shank has one of my novel replaceable ripper shoes S secured to its lower end. Such a cultivator has a frame, constructed conventionally to lower its ripper shanks a short distance into the ground, so that as the implement is towed forwardly by a tractor the individual rippers are pulled in the soil to loosen the soil. My implement can be used to rip cultivate between growing crop rows, or as well to rip up fields of dry land, as is customarily done several times a year. FIG. 2 is a side view of one of my ripper shanks 20, having my novel replaceable shoe S secured on its lower end, as will be explained. Shank 20 is a solid rigid and sturdy elongated member, usually operationally positioned on the frame substantially vertically during cultivator use. The front edge of 20 is scarf-sharpened, indicated as 10. To prevent the lower sharpened edge 10 portion of shank 20 from unnecessarily becoming dulled during soil ripping, as the implement is drawn by the shank forwardly during use with its lower end into the ground, or to the left as indicated by the horizontal arrow of FIG. 2, I provide my novel slip-on replaceable shoe indicated generally as S. As shown in FIG. 2, I sometimes bead weld an edge of the stirrup 32 of the shoe to the side of shank 20, in position as illustrated in FIG. 2, after the shoe is fully slip-on inserted onto a lower sharp end as in FIG. 2, but such welding is optional, as it is not necessary, as will be hereinafter explained.

Referring to FIG. 4, the right portion of that view shows an enlarged lower end of a ripper shank 20. The lower edge portion 21 of the shank 20 is formed at substantially a 45° angle to the longitudinal center line axis of the shank, for reason to be explained.

My shoe S comprises an elongated flat blade or plate 30 with a front end 30a sharpened. On the other under end 30b, of the plate 30, I secure, as by welding thereto, a U-shaped rigid stirrup member 32. Stirrup 32 has an inner opening 33 of configuration and size as shown, adapting 32 to fit slidably and snugly on, around and under the tongue 23 of the shank 20. Slot 22 in shank 20 is formed from the front edge 10 of 20 back a short distance into the shank 20 near its lower portion, and with the slot 22 formed parallel with the lower shank edge 21. Thus this forms a tongue 23 projection of the shank 20 at its lower end, as shown in FIG. 2. I manually insert shoe S by its plate 30 into that slot, with the plate end 30b frictionally fitting the slot 22 above the tongue, and thereupon the stirrup 32 completely encases down, around and snugly envelops the sides and bottom of tongue 23 of the shank 20. I optionally bead weld the edge 35, at one side of the stirrup, to the adjacent lower side of shank 20, as shown in FIG. 2, though such welding is not a requirement, but only a convenience to hold the shoe S in place, as shown in FIG. 2, when not in use or in the event of a wearing looseness of the shoe fit over the tongue 23, or upon a new shoe being needed. In the event of such welding, should it be necessary to remove the shoe S for any reason, the weld bead, 35, can be easily burned off for removing the shoe, after which burning the shoe is then downwardly removed to the left as illustrated in FIG. 2 from the tongue 23. Slot 22 is of a size for adapting a frictional insert of the rear portion 30b of the blade 30 of the shoe S into that slot, for a resultant shoe frictional holding of 30 by that slot thereupon such insert.

I provide a novel sturdy triangular fin member 31 on the upper surface of the shoe plate 30, as by welding it thereto, and with the fin substantially midway between the two ends of plate 30, as shown in FIGS. 2 and 4. As viewed in FIG. 2, upon slip-on essembly of shoe S onto the lower tongue 23 end of shank 20, the fin 31, on the upper surface of the blade of the shoe, is spacedly in front of and aligned with the front cutting edge 10 of the ripper shank 20. Thus, upon cultivator use forward moving of the ripper and its shoe through the soil below ground level, in direction to the left, as indicated by the horizontal arrow of FIG. 2, the fin blade 31 will divert the soil from striking directly against the adjacent sharp front edge 10 of the ripper shank 20, and thus such diversion of the soil by the fin 31 will consequently reduce the otherwise rapid resultant soil wear of that edge 10 were not that preceding fin 21 so protectively positioned during cultivator use. Also the fin in such use, prevents shank caused damaging hooving, or soil slick dirt piling, against adjacent growing crop rows, when ripper shank cultivator is used between growing crop rows.

It is to be noted that I form slot 22 in the shank 20, such as by arc cutting and/or grinding, so that the slot is substantially parallel with the lower edge portion 21 of the shank 20, as seen in FIG. 4, so that, upon the shoe S slip-on securement, just explained, of shoe plate 30b into that slot 22, and with stirrup 32 around tongue 23 and the lower tongue edge 21, that structure results in a preferred angle of the longitudinal line of the plate 30 of the shoe being positioned with relation to the longitudnal axis of the ripper shank 20, as indicated in FIG. 2, by the dotted arc lines A and C, namely: The angle of the plane of the blade 30, of the shoe with relation to that longitudinal center line of the ripper shank 20, as measured on the illustrated lower dotted arc line A, is substantially 40°, and such angle as measured on the upper dotted arc angle thereof is substantially 140°. On ripper cultivator use, there is a slight slanting forwardly from the perpendicular of the ripper shank 20. Thus, upon cultivator implement pulling use, of the combined ripper blade 20 with my shoe S in place, as shown in FIG. 2, there is a suitable downward forward decline of the plane of the shoe plate 30 of shoe S. Such is sufficient to cause a soil pressure against the point of that blade, 30a, resulting in a counter-clockwise torque soil pressure there against point 30a, as viewed in FIG. 2, on a Fulcrum point at outer end of slot 22, indicated at point 22a, of FIG. 4, as will be further explained.

The fin projection 31, secured between the ends of shoe blade 30 on its upper surface, has its forward edge 31a at a projected arc angle of substantially a 30° ahead of and with relation to the front leading edge 10 of the ripper shank 20, for better soil ripping use protection by fin 31 of the trailing aligned sharp edge 10 of the ripper shank 20. While the front edge 31a of fin 31, is illustrated in FIG. 2 as being preferably in a vertical position, upon use of the implement ripper, such 31a does not necessarily need to be exactly vertical on ripper use, but edge 31a could be of a variable position, with relation to the front edge 10 of the ripper, so long as such edge 31a and its member 31 are necessarily plane aligned with and in front of shank edge 10 a spaced distance ahead of edge 10. Said fin 31 can also be of a larger proportion, if desired, than the proportion as shown, so long as in relative relationship position, on 30 with relation to 20, during use with and as a part of the ripper combined shank 20 and shoe S secured to 20.

My stirrup 32, of shoe S, is U-shape configuration secured under shoe blade end 30b, as by being welded thereto. Stirrup 32 is adapted in size and proportion to fit snugly over the tongue 23, at the lower end of shank 20, upon cultivator implement moving the ripper 20–30 forwardly, through the soil in direction to the left of the arrow D of FIG. 2. Stirrup 32 assists in frictionally holding the blade 30 onto tongue 23. Both the blade 30, with its end 30b fully frictionally within the slot 22, and the stirrup 32 fully frictionally snugly around the lower tongue portion 23 of the ripper shank 20, act together to hold the shoe on lower end of 20 from counter-clockwise movement, as shown upon cultivation use, on the Fulcrum point at lower front slot end 22a, as viewed in FIG. 2. Though such canti-lever soil pressure against the front portion of the plate 30, occurs upon cultivating use, the sturdy construction of the slip-on shoe S, by its plate 30 having its 30b end in slot 22 and by its stirrup 32 over the tongue 23, during soil cultivation use, firmly frictionally holds my replaceable shoe S in securement position as illustrated in FIG. 2, as the lower end of the ripper 20. Such securement is without the need of any tool securement of bolts or screws to fasten my single replaceable shoe S in such slip-on attachment on 20, as shown and described.

Blade 30 of my shoe S, with its sharpened point 30a, comprises the digger point means of my replaceable shoe S. My novel single vertical fin 31, secured centrally on the upper 30 surface, comprises fin means thereon ahead of the ripper shank edge 10, on implement use. It is to be noted that said fin 31 means is positioned on my replaceable shoe so that, upon assembly of the shoe on the lower end of the ripper shank, the fin is in alignment with and a spaced distance in front of the front ripper edge 10, of the shank to which the shoe is attached, for diverting the soil from directly striking and thus protecting the vertical shank front cutting edge, on cultivator use thereon, and for fin preventing ripper shank 20 otherwise causing damaging shank dirt build-up or pile-up against adjacent growing crop rows on cultivator shank 20 use between growing crop rows.

Though the stirrup 32, upon slip-on essembly of my replaceable shoe S on the lower tongue 23 of the shank, is sometimes bead welded at an edge of the stirrup onto the shank, such welding is not required, as heretofore explained. When the welding is used the bead weld spots may be burned off to melt the bead welds and permit the shoe member S to be slidably removed, downwardly and to the left as illustrated in FIG. 4, off of tongue 23. When the replaceable shoe 30 and its blade become worn and dulled, the shoe can be removed as indicated in FIG. 4, as explained, and the desired point edge 30a sharpened and the shoe replaced or an entire new shoe can be substituted, as may be desired.

The surfaces of the shoe S and also of the fin 31 are provided conventionally with hard surface weld beads thereon, for anti-wear thereof on ground cultivation use.

My novel shoe S, is a single replaceable slip-on shoe member, having parts 30, 31, 32, 30a, 30b, and adapting the member S for slip-on frictional securement onto the lower end 23 of the ripper shank arm 20, at slot 22 and tongue 23. Such shoe S securement is accomplished without the need of any bolt or screw attachments to secure same to 23. My shoe S is a self-holding shoe on the tongue 23 of the ripper shank during cultivator use, when not welded thereon. My shoe S does not need to be secured onto the tongue 23 with its plate end 30b in slot 22 by any welding at 35, as heretofore explained. My shoe may be replaceably inserted, into the position illustrated in FIG. 2, and held in that position by the frictional fitting of 30b in 22 and of 32 around tongue 23. That holding is accentuated as a result of cultivator forward motion, on ripper cultivator use, causing soil pressure, from the left, as viewed in FIG. 2, against point 30a of blade 30 of the shoe S, being counter-clockwise pressure on 30 as there viewed. That pressure accentuates the tight frictional fit of the upper surface of the blade end 30b, of the plate 30, against the upper inner 22b edge of the slot 22, and also accentuates the tight frictional abutment frictional fit of strap step 33a, of the stirrup 32, against the underside of its adjacent lower edge 21, of the lower tongue end 23 of the shank, at the same time. Thus a holding of the shoe S in operative cultivating position onto the lower end of the shank 20 during cultivator use, as shown in FIG. 2, and explained, is assured. Such holding is a self-holding accomplished without the use of any attachment fastening members, such as bolts or screws being necessary. My novel replaceable shoe S is adapted to be slip-on secured to the tongue 23 at the lower end of 20, in tight frictional fitting sufficiently to be so retained thereon, and so held together in cultivator use without any welding, or, as previously explained, through a stirrup edge may be optionally bead-welded, as at the edge 35 to the side of the shank 20, if desired, but such welding is not necessary.

While I have shown a preferred embodiment of my invention, with a slot 22 formed as illustrated in FIG. 4, in the front lower front edge portion of the ripper shank 20, and in which the rear shoe end 30a of the shoe S blade is frictionally inserted, it is to be understood that such a slot and plate frictional holding insert structure is not necessary within the teaching of this invention, in accomplishing my novel single replaceable shoe member attachment for a ripper blade of a ripper shank. I show a modified shoe in FIGS. 5 and 6. Such slot 22 in shank 20 may be eliminated, as shown by the modification in my FIGS. 5 and 6. In that modification, a substitute slot is provided at the rear end of a similar but modified shoe plate 40, shown as having an alternate slot 51 at the plate 40b end thereof. In this modification, the lower end of the ripper shank 20 is solid without such a slot 22 as heretofore. The other construction of my replaceable shoe S is as before in FIG. 4, except that in FIGS. 5 and 6 I have renumbered some of the parts. In FIGS. 5 and 6 shoe S' modification, the modified shoe plate is numbered 40 and has a similar upright fin numbered 41. A slot is provided in the rear end of modified plate 40, numbered 51, and has internal U slot edges 50 at its said slot end 40b. The stirrup 32, secured under 40, is constructed as before on the under plate 40b end. Instead of the preferred slot 22, at the lower end of ripper shank 20, there is no slot there, but there is provided in this modification two spaced apart right angularly positioned stop lugs spaced and positioned and weld secured as illustrated, as L and L', on each side of the shank 20, in the relative shank position thereon as shown. The plate 40 has a slight extension at its plate end, 40b, beyond the U stirrup 32, for purpose of permitting that extension 40b, upon slip-on insert of the modified replaceable shoe S' onto the lower end of such a shank 20, to extend and be positioned as shown between those stop lugs L and L'. In this shoe modification S' its stirrup 32 is of a dimension on use to snugly envelop the lower end 23 of the shank 20, as shown in FIG. 6. Thus at the same time the rear end 40b of the modified plate 40 will fit snugly between those two stops L and L' and when, at the same time of such insert of shoe S' on the lower end of shank 20, that the inner end of the slot 51 of shoe S' will abut and rest on the front edge of the adjacent ripper shank 20, indicated as 52. That point 52 is the Fulcrum point, for this modified shoe S', of the canti-lever tendency pressure upon the front lower end 40a of the blade 40, upon soil cultivation use, as indicated by dotted arc line R. From this modified shoe structure, as shown in FIG. 6, it will be seen that said soil pressure will act to cause a holding of the plate 40 on that Fulcrum point 52, and as a result of the lower web 33a of the stirrup pressing upwardly against the lower edge 21 of the ripper shank, and also as a result of the upper surface of plate end 40b pressing upwardly against the underside of stop L. There are a like pair of identically placed, spaced and aligned stop lugs L and L' on each side of shank 20, in this modification. It will be seen in this modification that the modified replaceable shoe S' is frictionally also self-holding held in place upon use, as a result of this construction without the need of bolt or other securement parts or tools.

Having thus shown and described a preferred embodiment and a modification of the principles of my invention, since many changes may be made within the teaching thereof, I wish it to be understood that I am to be bound only by the hereunto appended claims.

What I claim and desire to secure by Letters Patent is:

1. In combination, with a substantially vertical, straight ripper implement shank operably held by an agricultural cultivator implement, with the lower front edge portion of the shank sharpened and having a slot therein formed near its lower end and rearwardly of the shank from its front edge, and the shank having a substantially straight bottom edge surface parallel with the slot, the combination therewith of a single replaceable slip-on ripper shoe member adapted for slip-on frictional securement to the lower end of the shank wherein said shoe member comprises a plate portion having a sharpened leading edge portion and a downwardly extending stirrup portion secured to the underside of the rearward portion of said plate, and an upstanding rigid fin having a leading edge, said fin being secured to the plate midway of its ends on the side thereof opposite from the stirrup, with said slot and said rearward portion of said plate being of respective sizes with relation to each other for adapting said rearward portion of the plate to be frictionally fit inserted into and be frictionally held by the slot, and with said stirrup being of a size adapting it to frictionally fit snugly over the portion of the shank below the slot for a frictional stirrup holding of the replaceable shoe member onto said lower end of the ripper shank, and whereby upon use of the implement cultivator ripper with the shoe so secured thereto said fin will divert the soil from directly striking the front lower edge of the sharpened ripper shank as it is drawn through the soil and consequently upon such ripper use said fin will reduce soil wear of the front lower sharp edge of the shank, and whereby the fin will prevent soil chunking damage to adjacent growing crop rows on row crop cultivation; wherein the leading edge of said fin is substantially vertical and is aligned with, and directly ahead of, the front edge of said shank member when said shank and shoe attachment are in working position.

2. A replaceable slip-on shoe adapted to be removeably attached to the lower end of an agricultural tiller ripper shank member having a straight front edge, with said ripper and shoe operable forwardly through the soil to loosen the soil, said ripper shank having a slot means formed therein adjacent its lower front end and with the shank portion between the slot and its lower end forming a tongue means at the shank front lower end, and with the shank having a flat surface edge portion at the shank lower end, the combination therewith of the replaceable shoe attachment comprising, a blade having a sharpened leading edge portion and a rearward portion, a rigid upstanding fin secured onto the upper surface of the blade midway of its ends, a stirrup secured to the underside of the blade near the rearward portion, said rearward portion of the blade and said slot being respectively adapted to permit the shoe blade rearward portion to fit frictionally in and be held by the slot, and at the same time as such blade fits in the slot said stirrup is adapted to fit frictionally over and snugly envelops the lower tongue end of the ripper shank, whereby, upon such slip-on blade insert of its rearward portion in the slot and while such stirrup enveloping around the tongue, a frictional holding of the replaceable slip-on shoe onto the lower tongue of the ripper shank will be effected by both said rearward portion of the blade snug frictional fitting in the slot and by said stirrup around the tongue; wherein the leading edge of said fin is substantially vertical and is aligned with, and directly ahead of, the front edge of said shank member when said shank and shoe attachment are in working position.

3. An agricultural tiller implement having a frame and at least one shank operably secured to said frame and extending downwardly from said frame for insertion into the ground, and in combination therewith a replaceable ripper shoe member adapted to be attached to the lower end of said shank, said shank having a bottom edge and a straight front edge, wherein the lower end of said shank includes a slot extending rearwardly from said front edge into said shank, wherein said lower end of said shank comprises a tongue member whose top surface is defined by said slot and whose bottom surface is defined by said bottom edge of said shank, wherein said shoe member comprises (a) a plate having a sharpened leading edge portion, a rearward portion, and a planar upper surface, (b) a stirrup member secured to and extending downwardly from the underside of said plate, and (c) a rigid upstanding fin member secured to said upper surface of said plate between said leading edge portion and said rearward portion; wherein said slot in said shank is adapted to slidably receive said rearward portion of said plate and wherein said tongue is adapted to be slidably engaged and surrounded by said stirrup, whereby said shoe member is forcibly retained on said lower end of said shank when said shank is moved forwardly in the ground by movement of said implement; wherein said fin is aligned with and directly ahead of said front edge of said shank, and wherein the leading edge of said fin is substantially vertical when said shank and shoe member are in working position.

4. A tiller implement in accordance with claim 3 wherein said fin is triangular and wherein the base of said fin is secured to said upper surface of said plate.

5. A tiller implement in accordance with claim 4 wherein the base of said fin is shorter than said plate, and wherein said fin is secured to said plate midway between said leading edge portion and said rearward portion.

6. A tiller implement in accordance with claim 4, wherein the height of said fin is approximately equal to one-half the length of said plate.

7. A tiller implement in accordance with claim 3 further comprising wheels attached to said frame.

8. A tiller implement in accordance with claim 3 wherein the angle between said upper surface of said plate and the longitudinal center line of said shank is approximately 140°.

9. A tiller implement in accordance with claim 3 wherein said slot in said shank and said bottom edge of said shank are parallel to each other.

10. A tiller implement in accordance with claim 9, wherein said bottom edge is disposed at an angle of approximately 45° to the longitudinal center line of said shank.

11. A tiller implement in accordance with claim 8, wherein the angle between said leading edge of said fin and said front edge of said shank is approximately 30°.

12. A tiller implement in accordance with claim 17, wherein the width of said fin member is less than the width of said lower end of said shank.

13. A replaceable ripper shoe adapted to be slidably and removably attached to the lower end of an agricultural ripper shank member having a straight front edge, said shoe comprising:
   (a) a plate member having planar top and bottom surfaces, a sharpened leading edge portion, and a rearward portion,
   (b) a U-shaped stirrup member secured to and extending downwardly from said bottom surface of said plate member, said stirrup member being adapted to slidably engage and snugly envelop said lower end of said shank member, (c) a rigid upstanding fin member secured to said top surface of said plate member between said leading edge portion and said rearward portion, wherein the base of said fin member has a length less than the length of said plate member and said fin member is secured to said top surface rearwardly of said leading edge portion; wherein the leading edge of said fin is adapted to be substantially vertical, and aligned with and directly ahead of said front edge of said shank member, when said shank and shoe are in working position; whereby said shoe is adapted to be forcibly retained on the lower end of said shank member when said shank member is moved forwardly in the ground.

14. A replaceable ripper shoe in accordance with claim 13, wherein said stirrup member is adapted to slidably engage and snugly envelop a forwardly projecting tongue member on said lower end of said ripper shank member, and wherein said rearward portion of said plate member is adapted to slidably engage a slot in said lower end of said shank member.

15. A replaceable ripper shoe in accordance with claim 13, wherein said rearward portion of said plate member includes a rearwardly facing slot which is adapted to slidably engage said lower end of said shank member.

16. A replaceable ripper shoe adapted to be slidably and removeably attached to the lower end of an agricultural ripper shank member having a straight front edge and a forwardly facing slot in said lower end, said shoe comprising:
(a) a plate member having planar top and bottom surfaces, a sharpened leading edge portion, and a rearward portion,
(b) a U-shaped stirrup member secured to and extending downwardly from said bottom surface of said plate member, said stirrup member being adapted to slidably engage and snugly envelop said lower end of said shank member,
(c) a rigid upstanding fin member secured to said top surface of said plate member midway between said leading edge portion and said rearward portion; wherein the base of said fin member has a length less than the length of said plate member; wherein the height of said fin is approximately equal to one-half the length of said plate member;
wherein the leading edge of said fin is adapted to be substantially vertical, and aligned with and directly ahead of said front edge of said shank member, when said shank member and shoe are in working position; whereby said shoe is adapted to be forcibly retained on the lower end of said shank member when said shank member is moved forwardly in the ground.

17. A replaceable ripper shoe in accordance with claim 16, wherein said fin member is triangular, and wherein hard surface weld beads are provided on said top surface and said leading edge of said fin.

18. The method of slip-on removeable attachment of a replaceable ripper shoe to the front lower forwardly projecting tongue end of an agricultural substantially vertical tiller ripper shank, wherein said shoe comprises a plate having top and bottom planar surfaces and a rearward end portion and a rigid upstanding fin member secured on the top side of the plate and a U-shaped stirrup secured to the underside of the plate, the method comprising the steps of:
(a) forming a slot in the lower portion of the shank near its lower end, said slot extending rearwardly from the front edge of said shank, wherein said slot is of a size adapted to frictionally receive said rearward end portion of said plate;
(b) inserting said rearward end portion of said shoe plate into the slot and thereby also enveloping the lower tongue part of the shank by and within said stirrup, for slot and stirrup securement of the shoe to the tongue of the shank on shank tiller use.

19. The method of slip-on removeable attachment of a replaceable ripper shoe to the lower front end of an agricultural operational substantially vertical tiller ripper shank, wherein said shoe comprises a plate having top and bottom planar surfaces and a rearward end portion and a rigid upstanding fin member secured on the top side of the plate and a U-shaped stirrup secured to the bottom side of the plate, the method comprising the steps of:
(a) forming a longitudinal slot in the rearward end portion of said plate, said slot being of a size adapted to frictionally engage said lower front end of said shank;
(b) inserting the lower part of the shank into said slot in said plate, whereby the shoe stirrup will then envelope the lowermost part of the shank within the stirrup, for thereby stirrup securing the shoe to the shank by the stirrup cooperating in such securing with the slot.

* * * * *